July 26, 1966

L. N. MERTZ ETAL 3,263,079

METHOD FOR FORMING AN IMAGE OF AN INVISIBLE
RADIATION PATTERN AND APPARATUS
FOR COPYING THE IMAGE

Filed Nov. 26, 1962

INVENTORS
Lawrence N. Mertz
Niels O. Young.
by Roberts, Cushman & Grover
ATT'YS

United States Patent Office 3,263,079
Patented July 26, 1966

3,263,079
METHOD FOR FORMING AN IMAGE OF AN INVISIBLE RADIATION PATTERN AND APPARATUS FOR COPYING THE IMAGE
Lawrence N. Mertz, Cambridge, and Niels O. Young, South Lincoln, Mass., assignors to Block Engineering, Inc., Cambridge, Mass., a corporation of Delaware
Filed Nov. 26, 1962, Ser. No. 240,107
17 Claims. (Cl. 250—65)

The field of this invention is photographic recordation of original patterns defined by electromagnetic radiation of wavelengths that cannot be imaged by the conventional optical expedients of reflection, refraction or diffraction.

It has heretofore been proposed to explore such wavelength regions, and especially those ranging from gamma and X-rays through the ultraviolet on the one side and through the entire infrared range on the other side of the visible spectrum, by means of shadows of the well-known Fresnel zone plates such as for example described in "Wood, Physical Optics," Third Edition, page 37 et seq. Such shadow records of an original pattern can then be used to focus printing light of conventional wavelengths to furnish a measure of the original pattern. However these previously proposed techniques have not proved to be very practical because of poor record quality as to definition as well as contrast and particularly because of an irregular background pattern of the type of a superimposed noise.

Objects of the present invention are to provide a technique of the above-indicated general character which avoids these and other defects; which considerably reduces the exposure time without impairing the quality of the final record; which permits the use of wavelengths best suited for each stage of the technique as required by object and recordation material; and which provides records by means of non-imaging optical apparatus with essentially as good a resolution as that obtainable by way of pin-hole cameras but permitting the utilization of much more energy. A particularly important object is to provide optical imaging techniques which permit original recordation with wavelengths shorter than 1000 A. while avoiding to a very favorable degree the above-mentioned unwanted background and also avoiding color aberration while providing comparatively good definition. Additional objects are to provide such a system which permits star mapping with ultraviolet or X-rays, and other work such as spectrography in these wavelengths thus permitting very wide band spectrography; and to provide an optical system which does not require the use in such original wavelengths of refractive, reflective or diffractive elements and yet permits fairly short exposure times corresponding, in effect, to comparatively large conventional primary apertures.

The nature of the present invention can be shortly characterized as residing in the preparation of a record of radiation that cannot be handled with conventional optical elements, in the form of shadows of a Fresnel zone plate pattern, individual points of an original field such as stars at infinite distance; or beams furnished by spectroscopic apparatus being mapped by respective shadows of a zone plate which replaces the slit images of the conventional recording apparatus. These recorded shadows are then reconstructed by using the shadow record of each original point or beam as a lens to image a light beam essentially at a point according to the Fresnel plate principle, by means of conveniently selected monochromatic light. The end result is an array of point records corresponding to the original pattern or array. In accordance with the invention, an intermediate step of minifying the original shadow record is used to provide short focus zone plate records especially suited for use in the reconstruction by imparting to the reconstructed zone plate record thickness or slope discrimination and hence a discriminantly reflecting, refracting or phase modulating character. Further in accordance with the invention, unwanted background is substantially reduced by the use of a fragmentary, non-centered Fresnel zone plate pattern in conjunction with selective masking means for printing from the reconstructed record, thereby suppressing all images but one selected focal plane of the individual imaging zone plates making up the reconstructed record, for suppression of the above-mentioned unwanted background. Further aspects of the invention are concerned with apparatus for printing by reflection from focusing Fresnel zone plate records of the above-indicated type, which is especially suitable for essentially reducing the unwanted background effects.

Stated somewhat differently, the invention comprises in its method aspect the steps of directing a pattern of radiation beams of a given wavelength through a reticle means resembling a Fresnel zone plate but of dimensions which avoid focusing by diffraction at that wavelength to obtain as shadows a pattern of individual zone plate records which map the original radiation pattern, and of directing monochromatic, preferably visible, light either collimated or coming from a point source or generally speaking homogeneously urged, through the zone plate record which maps the original radiation beams and now functions as a focusing Fresnel zone plate means, thereby to obtain a pattern of points that maps the pattern of zone plate records and hence the shadow pattern of the original object field beam pattern, and of the latter itself. The shadow zone plate record is usually minified for shortening of effective focal lengths with a selected conventionally focusable wavelength, and preferably modified for phase modulation by reflection or transmission.

In a very important aspect of the invention the level of unwanted background is reduced by converting the shadow record to a phase modulating reflector or transparency, and to increase photographic latitude.

In another important aspect the invention contemplates the reconstruction of the converted shadow record by way of a screen which selects an array of point images corresponding to just one order of diffraction by the Fresnel zone plate record. The shadow casting plates used for that purpose have, according to the invention, a configuration which does not include the center of the conventional circular zone plate. A practically advantageous shadow plate comprises according to the invention a first fragmentary non-centered Fresnel plate structure with essentially rigid concentric ring segments and a second similar structure superimposed on and fastened to the first one such that the two portions form a self-supporting structure, with opaque portions made of self-supporting material whereas the interstices are empty or of non-supporting material.

These and other useful objects and characteristically novel aspects of the invention will become apparent from the following presentation of its theoretical principles so far as necessary for its understanding, and the description of several practical embodiments of the method steps thereof and of the apparatus used therein.

The description refers to drawings wherein.

Figure 1:
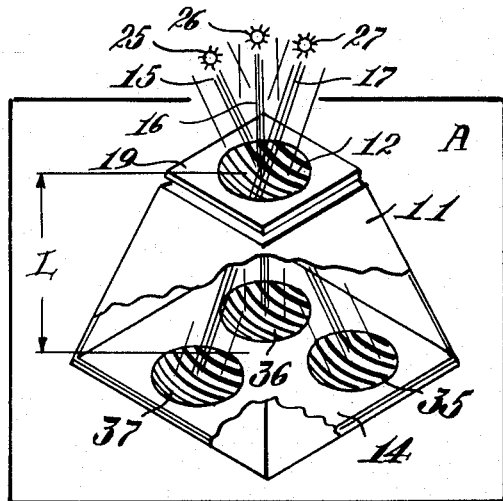
FIG. 1 is a flow sheet of the method according to the invention which also indicates schematically how its steps are carried out.
Figure 1:
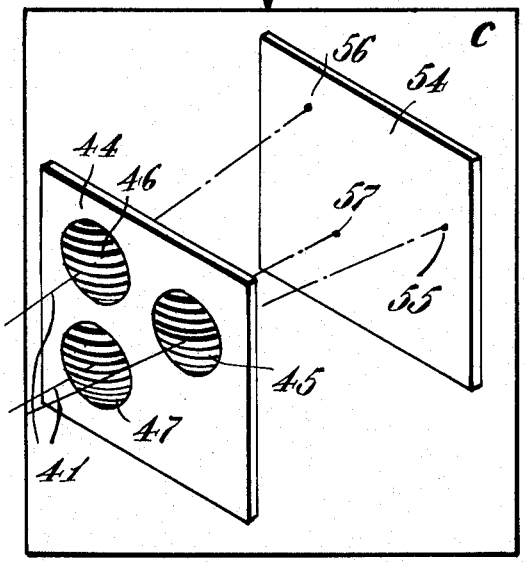
Figure 3:
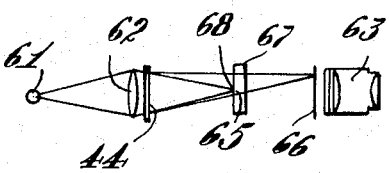
Figure 5:
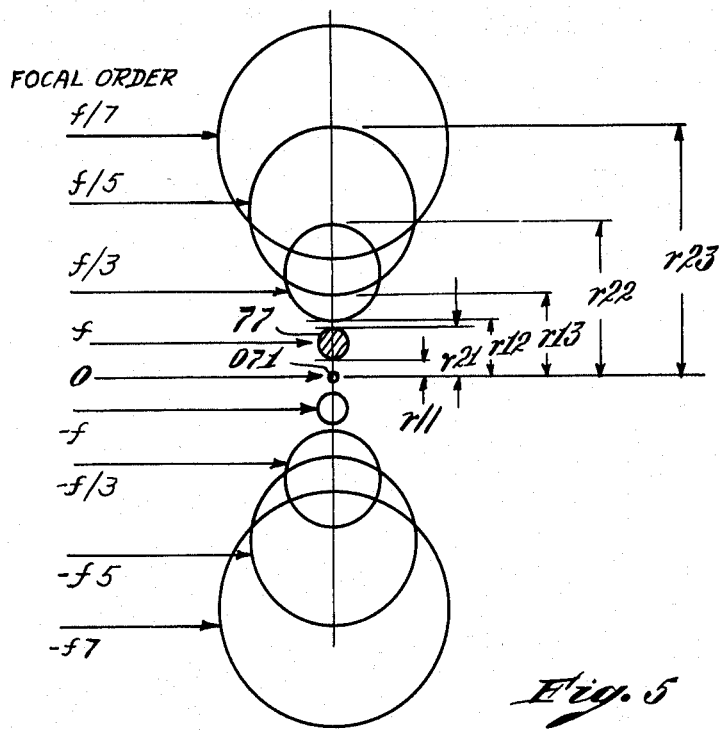
Figure 4:
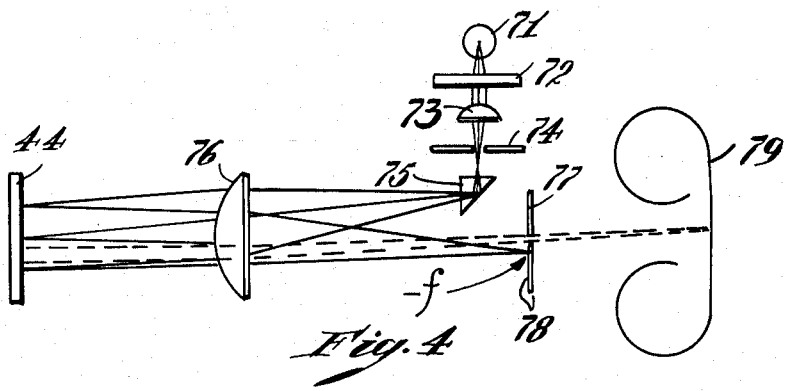
Figure 6:
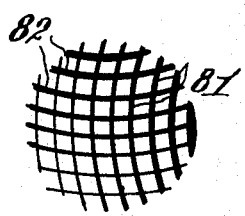
Figure 7:
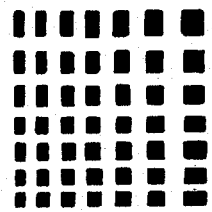

FIG. 3 schematically illustrates one mode of carrying out the reconstruction step according to FIG. 1;

FIG. 4 is a diagrammatical elevation of an optical system for carrying out the final reconstruction step, as one possible modification of the system according to FIG. 3;

FIG. 5 is a diagram explaining the selection of mask apertures for apparatus such as according to FIG. 4 or of apparatus analogously constructed;

FIG. 6 schematically illustrates the self-supporting double grid zone plate, likewise according to the invention; and FIG. 7 illustrates, for purposes of another embodiment of the invention, a zone plate with crossed linear zones.

The concepts of the method according to the invention will first be outlined with reference to FIG. 1, before describing more specific method and apparatus aspects and details of technique for each step. While FIG. 1 refers, by way of practical embodiment, to star photography with short wave ultraviolet light, X-rays, gamma rays, or neutrons, it is expressly understood that the invention has other applications such as for example spectroscopy in wavelength regions which cannot be managed wtih conventional optical expedients.

In block A of FIG. 1, numeral 11 denotes a schematically depicted conventional astronomical camera, the lens of which is replaced by a shadowing or shadow casting reticle 12. While this zone plate has the configuration of Fresnel zone plates such as for example described in the above cited textbook by Robert W. Wood, it must be carefully kept in mind that within the present method this taking element, replacing the lens of a camera, does not function as a classical Fresnel zone plate because its narrowest transparent zone has at least the widths of a corresponding pin-hole camera as likewise described, on page 272, in the Wood textbook. Consequently, this zone plate reticle is much too close to the film to produce any focusing effects. Instead it casts shadows and is therefore herein referred to as "shadow zone plate." The size of this plate is inconsequential, so long as it does not produce the Fresznel zone plate effect with the original or taking wavelength. As a matter of fact, it is preferably as large as can be accommodated and consistent with other requirements of the present technique. The use of such a shadow zone plate has the advantages that aberrations do not limit the camera aperture, the film distance, or the angular field. These parameters are instead limited mainly by the field size and by vignetting, by practical technological limits of reticle construction, and by film fogging from noise frequency illumination in the object field. The particular fragmentary shadow zone plate configuration illustrated in FIG. 1 and further described with reference to FIG. 2, while particularly beneficial for purposes of the present invention, does not have to be used necessarily but a conventional zone plate with cocentrical rings will be sufficient for many purposes, with the advantages of the present invention attained otherwise at least partly.

Numeral 14 denotes a film or plate, the emulsion properties of which will be discussed hereinbelow. Ray bundles 15, 16 and 17 indicate light coming from stars such as 25, 26 and 27 at infinite distance. The large coarse zone plate 12 casts shadow patterns, one for each star, such as indicated at 35, 36, 37; a shadow element of the shadow zone plate being cast for each star. An appropriate filter plate, indicated at 19, limits the received radiation to a selected range, such as the X-ray or short ultraviolet regions of the spectrum. With short wavelengths, the shadows are not significantly blurred by diffraction and they are achromatic, as mentioned above. It should be observed that the shadow zone plate 12, for obvious geometrical reasons, casts only circular and not variously elliptical shadows, quite regardless of the angular location of the points in the object field, here for example the stars. This independence of the shadow configurations from incident light direction gives a very large usable field of view facilitating extensive sky coverage. It will of course be understood that for the purpose of this embodiment the camera has to be placed above the earth's atmosphere and the wavelengths have to be selected by appropriate filtering as mentioned above with reference to part 19. The film 14 will thus receive what might be referred to as shadow record or map consisting of an array of individual shadow patterns, one for each star. The individual shadow patterns may and usualy will overlap but this is largely irrelevant for present purposes.

As marked in the "Optional" block B of FIG. 1, certain supplementary operations are at this stage performed with the shadow record 14 before it is further utilized. These operations usually include a reduction in size, and a specific treatment of the film emulsion for purposes to be described in detail hereinbelow. While these intermediate operations are usually performed to provide better quality, they are not absolutely necessary.

Coming finally to block C of FIG. 1, the schematical diagram therein illustrates the final step which is herein referred to as "reconstruction." For reconstruction, the focusing zone plate record 44 which has been produced from the shadow record 14 by development, preferably reduction, and probably differential photographic treatment such as so-called "bleaching," is in suitable projection apparatus (such as will be described hereinbelow in more detail) exposed to directionally conditioned light, in the present example to a light beam 41 originating at a point source, here outside the block C. The size of the probably reduced elements 45, 46 and 47 of the reconstructed focusing zone plate record 44, and the wavelength of the beam 41 are so selected that these elements now actually perform as true Fresnel zone plates, that is similar to lenses. As mentioned above the dimensions of these elements should be such that they have conveniently short focal lengths for the visible light of beam 41, preferably monochromatic light for the purpose of excluding chromatic aberration during reconstruction. Each individual zone plate element now acts independently of the others and will focus similar to a lens, forming point images such as indicated at 55, 56 and 57 of block C, these images being cast upon final recording means such as a plate or film 54.

Recapitulating, a point by point map 55, 56, 57 has been produced of the original object points 25, 26, 27, through the intermediary of a shadow record 14 and a modified or possibly unmodified intermediate reconstructed zone plate record 44. Even if for some reason exact congruency of the various mapping records is avoided or cannot be obtained, these various mapping patterns will be related to each other by definite transfer functions.

It will now be evident that one of the main aspects of the invention is the wavelength transform from the original shadow recordation with non-imageable radiation to the reconstructive recordation by Fresnel diffraction with imageable, such as visible light, it being very important that the reconstruction step or steps permit a wide range of recordation possibilities by varying the zone plate configuration, the monochromatic reconstruction wavelengths, the optical characteristics of the reconstructed zone plate record, the practical apparatus implementation, the film sensitivity and structure, and analogous parameters.

Coming now to details of carrying out the above outlined method, such as were found to be practically particularly useful and at least some of which form part of the present invention, a preferable zone plate pattern will first be described with reference to FIG. 2.

Figure 2:
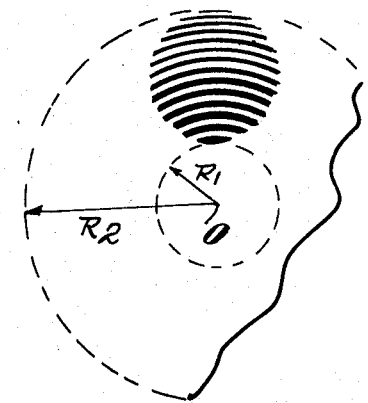
FIG. 2 illustrates the configuration and selection of non-centered shadow casting zone plates for purposes of the invention.

In FIG. 2, $R_1$ and $R_2$ are the inner and outer circles of a conventional Fresnel zone plate in which all zones have equal area, such as described by Wood, supra. According to the invention, a fragmental non-centered portion of such a plate is used. The choice of the portion of the Fresnel zone plate that is used relies upon the fact that $R_1/R_2 = r_{11}/r_{21} = r_{12}/r_{22} = r_{1n}/r_{2n} = \ldots$, where the various $r$ values have the significance explained with reference to FIG. 5. Further, because the foci of the zone plate are at $\pm f$, $\pm f/3$, $\pm f/5$ . . . etc., we have $$r_{12}/r_{11}=r_{22}/r_{21}=3$$

$r_{13}/r_{11}=r_{23}/r_{21}=5$; . . . etc. As a consequence of this, if a mask according to FIG. 5 is to transmit only the focus $+f$, an additional condition prevails that fixes the ratio of the zone plate radii, namely, $R_2/R_1 \leq 3$.

The significance of the focus values contained in the above discussion will appear from the explanation, hereinbelow, of the masking technique which is part of the present invention and which is premised on the above described zone plate configuration. Focusing effects are avoided if the narrowest zone is wide enough. If the transmitting portion of the narrowest zone has a width $dr$ then it is required that $(dr)^2 \geq \lambda L/2$ where L is the working distance of the shadow zone plate 12 from the film 14 and $\lambda$ is the wavelength of the original record radiation casting the shadows such as 35, 36, 37 at A of FIG. 1. The size of the reticle used is only limited by practical considerations such as vignetting between apertures of the film 14 and the shadow plate 12. In other words, the shadow plate can be as large as it is feasible to make it. A finely spaced one such as for use with X-rays where the above $(dr)^2$ relation will practically always be satisfied because the wavelengths are so small, will be limited in size mainly because of practical impossibility to make fine enough zones. In such a case it is possible simply to expand the whole pattern and to make a large shadow plate nevertheless. In general it can be said that the shadow plates should have a size comparable in order of magnitude to that of the film.

Coming now to auxiliary aspects such as referred to above with reference to the method steps indicated by the intermediary block B of FIG. 1, it is most always advisable to prepare a transparency of reduced size from the original shadow record 14 and the minified copy should be such that the individual zone plate elements of the ensemble or array 44 have conveniently short focal lengths for easily handled visible light used in the reconstruction step C. For purposes to be explained more in detail hereinbelow, the film 44 can be treated in various ways to improve the quality of the final record. Such treatment is often referred to as "bleaching" which term includes for present purposes emulsion modification adapted to express the record thereon in terms of emulsion thickness, or transparency or reflectivity regardless of thickness. Thickness or relief treatment provides a structure which can be utilized either by way of a phasing effect in transmission or reflection, or by way of an amplitude effect due to record defining transparency differentiation. Records which have been processed for amplitude effect, whether flat or otherwise, operate by way of absorption upon light transmission or reflection. It is also possible to deposit metal selectively on the record 44, making use of the relief of the film or emulsion surface.

As will appear hereinbelow, the quality of the final record 54 obtained by way of the present invention can be materially enhanced in two ways, namely, by using the intermediate record as a phase modulator, and secondly by a certain masking effect. These effects can be combined to best advantage.

In actual practice, a Fresnel focusing zone plate element analogous to a lens, such as 45, 46, 47 of block C of FIG. 1, passes a considerable amount of undiffracted light which raises the unwanted background level. As mentioned above, two different procedures have been used, preferably together, to diminish or even essentially to suppress the unwanted background. One approach is the above-referred to "bleaching" of the zone plate record such as to obtain a phase modulating transparency very much like in R. W. Wood's phase zone plates. In this manner, the reconstruction efficiency is improved relative to the undiffracted light. The second approach involves a focal isolation technique which is employed to remove undiffracted light, and will now be explained in principle with reference to FIG. 3.

In FIG. 3, numeral 61 denotes a monochromatic point source in the visible spectrum, 62 a lens, and 63 an eye piece. 44 is the reconstruction zone plate record which may or may not be of the off-center pattern configuration according to FIG. 2. Considering this system without the record 44, the lens 62 focuses the point source 61 at a point 65 which can be obstructed by means, for example, of a transparent plate 67 carrying an opaque dot 68, so that little light from there proceeds to the eye piece. When the zone plate record 44 is inserted however, it acts as negative lenses focusing the source 61 on the imaging plane 66 where the reconstructed image can be viewed by means of the eye piece 63.

For purposes of actual recordation instead of observation with an eye piece, the reflective phasing effect of the zone plate record combined with the masking technique according to FIGS. 4 and 5 is used at the present time. This set-up utilizes, in conjunction with the zone pattern according to FIG. 2, a mask pattern according to FIG. 5, mask distances and dimensions being such as to transmit only desired orders of diffraction from the fragmental zone plate element, such as 45, 46, 47 of the record 44 of FIG. 1.

Recapitulating, it should be kept in mind that focusing zone plate records obtained from shadow records in the simple fashion outlined with reference to FIG. 1 results in undesirable background illumination. This is because each zone plate in the reconstructed zone plate record not only passes the reconstructing beam undiffracted but has many foci at different axial distances $f_m$. Each zone plate, such as 45, 46, 47, has a pattern in which the radius $R_n$ of the nth zone edge is given by the relation $R_n = k\sqrt{n}$, where $R_1$ is the radius of the central disc. Every element of the zone plate record 44 has this configuration and each one will have foci due to its zones acting in groups of $m=1, 3, 5, \ldots, f_m = \pm k^2/m\lambda$. Thus, while the first order focus of the focusing zone plate record ($m=1$) for example, corresponds to the distribution in the original object field, stray light from all the other orders reduces the contrast. Complete background suppression can be obtained by using a fragmental, non-centered zone plate configuration in which the center of the zone lies outside the reticle as shown in FIG. 2. With a zone plate of such configuration all the foci lie on a line passing through the center of the zone marked O in FIG. 2. Therefore, by using a mask according to FIG. 5 all but one order of diffraction can be blocked as will become apparent from the following discussion of FIG. 4. This more elaborated masking technique is not to be confused with that described with reference to FIG. 3 where an obstruction object is used in conjunction with an eye piece.

In FIG. 4, numeral 71 denotes a point shaped light source such as a high pressure mercury arc lamp, in one practical embodiment an Osram lamp type HBO 100 W/2. 72 is a filter which passes Hg green, 73 is a field lens, and 74 is an aperture conjugate to the arc lamp 71 by means of the lens 73. 75 is a conventional reflecting prism, and 76 is an imaging lens. The reconstructed focusing zone plate record 44 is placed as indicated beyond the lens 76 and it is in this instance a high resolution plate prepared for reflection, in one of the ways indicated above. 77 is another aperture, in mask 78 conjugate to aperture 74 by means of the lens 76 and in the plane of zero order reflection from the record 44. The aperture 77 of mask 78 transmits only one order of the diffraction, namely, the one corresponding to the first order wit hthe focal length $-f$, such as indicated by hatching at 77 of FIG. 5. Undiffracted light can be cut off as in the Foucault test. The camera film 79 is at a plane which is conjugate to the aperture 74 by means of the lens 76 and the minus first order diffraction from the zone plate record 44, as clearly indicated in FIG. 4. The final record on film 79 will thus be of considerably improved quality. The dimensioning and off-axis location of the aperture 77 will be understood with reference to the above explanation referring to FIG. 5, having in mind that the plane of the mask 78 is in the paper plane of FIG. 5, and that the unhatched discs of various radii and axis location are the discs illuminated from the various focal orders, the open area or aperture of the mask being marked 77 in FIG. 4 as well as in FIG. 5. It will be noted that an image of the reconstruction source 71 appears on the mask at focal order zero as indicated by 071 in FIG. 5.

The emulsions and filters used in the present process are not critical. The primary shadow record 14 should normally be taken on the fastest film available for the wavelength being recorded, having in mind that the shadow zone plate structure 12 must be resolved by the film. Thus commercially available X-ray films with or without fluorescent auxiliary screens, or so-called Schumann film for the hard ultraviolet range, or special film techniques for recording neutrons can be used. Telemetering of records of this type is possible, whereby the primary shadow record 14 is received by the sensitive area of a vidicon or other television type picture tube.

The transformation of the shadow record map 14 into the reconstructed zone pattern map 44 is preferably carried out by means of high resolution film or plates. As mentioned above these can be used either in transmission such as in FIG. 3, or reflection such as in FIG. 4. When the reflection mode is used "corrugation" or "relief" of the emulsion surface caused by well-known emulsion processing methods (including those of etching, swelling and underlying developed grain) is made use of. It is also possible, and this has been actually carried out, to evaporate metal such as aluminum onto the surface of emulsions and to use this mirror film to increase the amount of available light when the emulsion surface is utilized as a phase structure.

Since the reconstructed images or fields of view can be observed visually such as indicated in FIG. 3, the choice of film for recording the final object point record is subject to familiar criteria such as whether the film has sufficient latitude to record detail at all levels of illumination desired, and whether it gives at the same time sufficient contrast to record desired features. Suitable selection of these parameters presents little difficulty at the present time where special emulsions for requirements analogous to those herein demanded are readily available.

As desired above with reference to FIGS. 2, 4 and 5 and the dimensional consideration connected therewith, the optical behavior of the reconstructed by diffractive Fresnel zone plate record is determined by the original shadow zone plate pattern which is used for shadow casting. These relations in a preferred embodiment are in detail described with reference to these figures.

Various modifications of the manner of utilizing the final output of such systems are possible. Observation by means of an eye piece, recordation on film, and storing on the screen of a cathode ray tube have been described or at least mentioned above. Other possibilities offer themselves, for example as scanning techniques such as on tape. A scanning technique which avoids undesired D.C. spikes uses alternate light and dark Fresnel zone plates as a chopping scanning aperture. Indeed any differencing technique which permits going negative circumvents the D.C. problem of the spike in the transfer.

While photographically obtained shadow zone plates are quite satisfactory for many purposes, it has been found that it is sometimes preferable to use somewhat different structures, such as patterns cut out by etching from shim stock in the manner now familiar through the printed circuit techniques. In order to obtain self-supporting structures of this type, the zone plate comprises two such patterns which intersect at approximately right angles near the center of the reticle. As a result two independent reconstructions of the shadow pattern in the same order can be observed or recorded. A practically usable reticle 12 of this type was 2½" in diameter and mounted 2½" away from the film plane 14. A structure of this type is indicated in FIG. 6, where 81 denotes one component zone plate made for example of shim stock and 82 denotes a second component arranged crosswise thereto, the two components being suitably joined for example by one of the now available cementing techniques which does not significantly add to the thickness of the composite structure and therefore does not impair its shadow casting quality. The two components can also be formed together.

Instead of Fresnel zone plates having purely circular zones, linear zone plates can be used whose spacing is identical to those of a Fresnel zone-plate. In this embodiment, illustrated in FIG. 7, the focal properties of a Fresnel zone plate can be replaced by the nearly identical focal properties of two linear zone patterns which cross each other at right angles. The technique of reticle photography using an eccentric portion of a Fresnel zone plate relies upon this portion of the Fresnel zone plate having the properties of a simple lens during the reconstruction operation. But a simple lens can always be replaced by two cylindrical lenses crossing each other at right angles. The substitution of crossed linear zone patterns for the Fresnel zone pattern is analogous.

It should be understood that the present disclosure is for the purpose of illustration only and that this invention includes all modifications and equivalents which fall within the scope of the appended claims.

We claim:

1. A picture recording method which comprises the steps of:
   casting within camera means shadows of a shadowing reticle with invisible radiation having a wavelength of less than 1000 A. from a point source configuration external to the recticle camera means, the dimensions of said reticle and of said camera means, and wavelengths of said radiation being so related that focusing and diffraction effects are essentially excluded;
   forming a faithful replica of the pattern of said reticle shadows as cast with said radiation within the field of view to be recorded; and
   optically reconstructing said pattern of said replica of the reticle shadows by using each reticle shadow replica as an optical element for concentrating visible reconstruction radiation into points corresponding to said original point sources, said reconstruction radiation being of a wavelength convenient for use in ordinary photographic and optical practice.

2. Method according to claim 1, wherein said pattern of shadow zone records is minified to obtain a Fresnel zone plate record reduced in size for correspondingly shortening the effective foci thereof upon reconstruction.

3. Method according to claim 1 wherein said replica of the shadow pattern is made in the form of a phase modulating configuration from which said external point source configuration can be reconstructed.

4. Method according to claim 3 wherein said pattern replica is made photographically in the form of a phase modulating configuration and wherein said optical reconstruction reduces the level of background noise and increases the photographic latitude.

5. Method according to claim 1 wherein said replica of the shadow pattern is made in the form of an amplitude modulating configuration from which said external point source configuration can be reconstructed.

6. Method according to claim 1 wherein said replica of the shadow pattern is made in the form of a simultaneous phase and amplitude modulating configuration from which said external point source configuration can be reconstructed.

7. Method according to claim 1 wherein said reconstruction radiation is focused by said shadow replica by transmitting it therethrough for said optical reconstruction.

8. Method according to claim 1 wherein said reconstruction radiation is focused by said shadow replica by reflecting it therefrom for said optical reconstruction.

9. Method according to claim 1 wherein said replica is, upon having been optically reconstructed, screened to select only one reconstructed pattern of points corresponding to only one order of diffraction by the focusing shadow record.

10. Method according to claim 1 wherein said reconstructing radiation is effectively directed only through a portion of said replica which does not include the center thereof.

11. Method according to claim 1 wherein said shadowing reticle is circularly symmetrical.

12. Method according to claim 1 wherein said shadowing reticle includes crossed Fresnel zone plates each having symmetry about a line.

13. A photographic method which comprises the steps of:
  directing a pattern of invisible radiation beams of a given wavelength of less than 1000 A. through a shadowing reticle having effectively the configuration of Fresnel zone plate means, the dimensions of said reticle and the wavelengths of said radiation being so related as to furnish at a given distance a diffractionless pattern of shadows mapping said beams;
  recording said shadow pattern;
  minifying said shadow pattern in the form of phase modulating Fresnel zone plate means; and
  focusing said minified pattern with visible light capable of being focused by said Fresnel zone plate means to obtain a reconstructed pattern of points mapping said pattern of shadows and hence of said beam pattern;
  whereby photographic records can be obtained of beams of radiation wavelengths which cannot be imaged by conventional optical focusing means.

14. A photographic method which comprises the steps of:
  directing a pattern of invisible radiation beams of a given wavelength of less than 1000 A. through a shadowing reticle having effectively the configuration of a fragmental Fresnel zone plate exclusive of the center thereof, the dimensions of said reticle and the wavelengths of said radiation being so related as to furnish at a given distance a diffractionless pattern of shadows mapping said beams;
  recording said shadow pattern; and
  focusing said recorded shadow pattern with visible light capable of being focused by said shadow pattern as true Fresnel zone plate means, while screening out all but one order of diffraction by the focusing shadow pattern, to obtain a reconstructed pattern of points mapping said pattern of shadows and hence of said beam pattern;
  whereby photographic records can be obtained of beams of radiation wavelengths which cannot be imaged by conventional optical focusing means.

15. A picture recording method which comprises the steps of:
  casting within camera means shadows of a shadowing reticle with invisible radiation having a wavelength of less than 1000 A. from a point source configuration external to the reticle camera means, said reticle having a series of essentially rigid ring segments together constituting a first portion of a Fresnel zone plate grating and a second similar series of segments superimposed on and fastened to the first series such that the two series cross each other to form a self-supporting structure with empty spaces between the segments, the dimensions of said reticle and of said camera means, and the wavelengths of said radiation being so related that focusing and diffraction effects are essentially excluded;
  forming a faithful replica of the pattern of said reticle shadows as cast with said radiation within the field of view to be recorded; and
  optically reconstructing said pattern of said replica of the reticle shadows by using each reticle shadow replica as an optical element for concentrating visible reconstruction radiation into points corresponding to said original point sources, said reconstruction radiation being of a wavelength convenient for use in ordinary photographic and optical practice.

16. Reticle photography copying apparatus comprising:
  an array of Fresnel focusing zone plate means having a multiplicity of foci at different axial distances, and produced as a record by exposure to invisible radiation through a shadowing reticle;
  a source of visible light;
  means for directing a beam of light from said source towards said record for focusing thereby of respective portions of the beam on several planes therebeyond on an optical surface in a selected one of said planes; and
  mask means placed in a selected one of said planes for absorbing the light imaged in all but said selected focal plane.

17. Reticle photography copying apparatus comprising:
  an array of fragmentary Fresnel focusing zone plate means each having an eccentricity and a multiplicity of foci at different axial distances, and produced as a record by exposure to invisible radiation through a shadowing reticle;
  a source of visible light;
  means for directing a beam of light from said source towards said record for focusing thereby of respective portions of the beam on several planes therebeyond on an optical surface in a selected one of said planes; and
  mask means placed in a selected one of said planes other than said surface, and having an aperture displaced from the axes through the centers of said zone plates by an amount corresponding to said eccentricity of said fragmentary zone plate means for absorbing the light imaged in all but said selected focal plane.

References Cited by the Examiner

UNITED STATES PATENTS

| 1,561,149 | 11/1925 | Gage | 240—41.4 |
| 1,663,996 | 3/1928 | Collet | 96—27 |
| 3,079,501 | 2/1963 | Birks | 250—51.5 |

OTHER REFERENCES

"Optical Autocorrelation Measurement of Two-Dimensional Random Patterns," by L. S. G. Kovasznay et al., from "The Review of Scientific Instruments," vol. 28, No. 10, October 1957, pp. 793 to 797.

"The Role of Optics in Applying Correlation Functions to Pattern Recognition," by D. McLachlan, Jr., from the "Journal of the Optical Society of America," vol. 52, No. 4, April 1962, pp. 454 to 459.

RALPH G. NILSON, *Primary Examiner.*

W. F. LINDQUIST, *Assistant Examiner.*

Disclaimer 3,263,079.—*Lawrence N. Mertz*, Cambridge, and *Niels O. Young*, South Lincoln, Mass. METHOD FOR FORMING AN IMAGE OF AN INVISIBLE RADIATION PATTERN AND APPARATUS FOR COPYING THE IMAGE. Patent dated July 26, 1966. Disclaimer filed June 13, 1973, by the assignee, *Block Engineering, Inc.*

Hereby enters this disclaimer to claims 1 through 8, inclusive, claims 11 through 13, inclusive, and claim 15 of said patent.

[*Official Gazette October 30, 1973.*]